United States Patent [19]

Myint

[11] 4,182,746
[45] Jan. 8, 1980

[54] CARBON MONOXIDE MANUFACTURE

[75] Inventor: Myo Myint, Springfield, Pa.

[73] Assignee: Atlantic Richfield Company, Los Angeles, Calif.

[21] Appl. No.: 916,324

[22] Filed: Jun. 16, 1978

[51] Int. Cl.$^2$ ............................................. C01B 31/18
[52] U.S. Cl. ............................. 423/415 A; 423/653; 48/196 A; 252/373
[58] Field of Search ............... 423/415, 415 A, 653; 48/196 A; 252/373

[56] References Cited

U.S. PATENT DOCUMENTS

| | | | |
|---|---|---|---|
| 2,198,553 | 4/1940 | Roberts, Jr. et al. | 423/415 A |
| 2,526,521 | 10/1950 | Voolhies, Jr. | 48/196 A |
| 3,630,676 | 12/1971 | Davis et al. | 423/415 A |
| 3,943,236 | 3/1976 | Green | 252/373 X |

Primary Examiner—Earl C. Thomas
Attorney, Agent, or Firm—John R. Ewbank

[57] ABSTRACT

Methane reacts with steam and at least some carbon dioxide in a primary fuel conversion zone, the effluent from which is mixed with the effluent from a secondary fuel conversion zone, and the mixture is sent through a dewatering zone, a drying zone, and a zone in which the carbon monoxide product stream is separated from the dry recycle stream. Such recycle stream is sent to a divider so that, if desired, a portion of the recycle can be directed as a part of the total feed to the primary conversion zone, and at least some of the recycle stream plus at least some of the carbon dioxide feed is directed through a secondary fuel conversion zone, in which hydrogen and carbon dioxide react to form water and carbon monoxide. Ordinarily such a plant is built when the available supply of carbon dioxide is at least about 75% (molar) of the demand for carbon monoxide, and when minimization of methane consumption is desirable, so that under optimum conditions the overall net reaction is the oxidation of a mole of methane by three moles of carbon dioxide to produce four moles of carbon monoxide plus two moles of steam. The plant has flexibility of operation, so that carbon monoxide can be manufactured even when some supplies are curtailed. For example, sufficient recycle gas can be removed to prevent any build up of a component to a concentration which might be troublesome.

1 Claim, 1 Drawing Figure

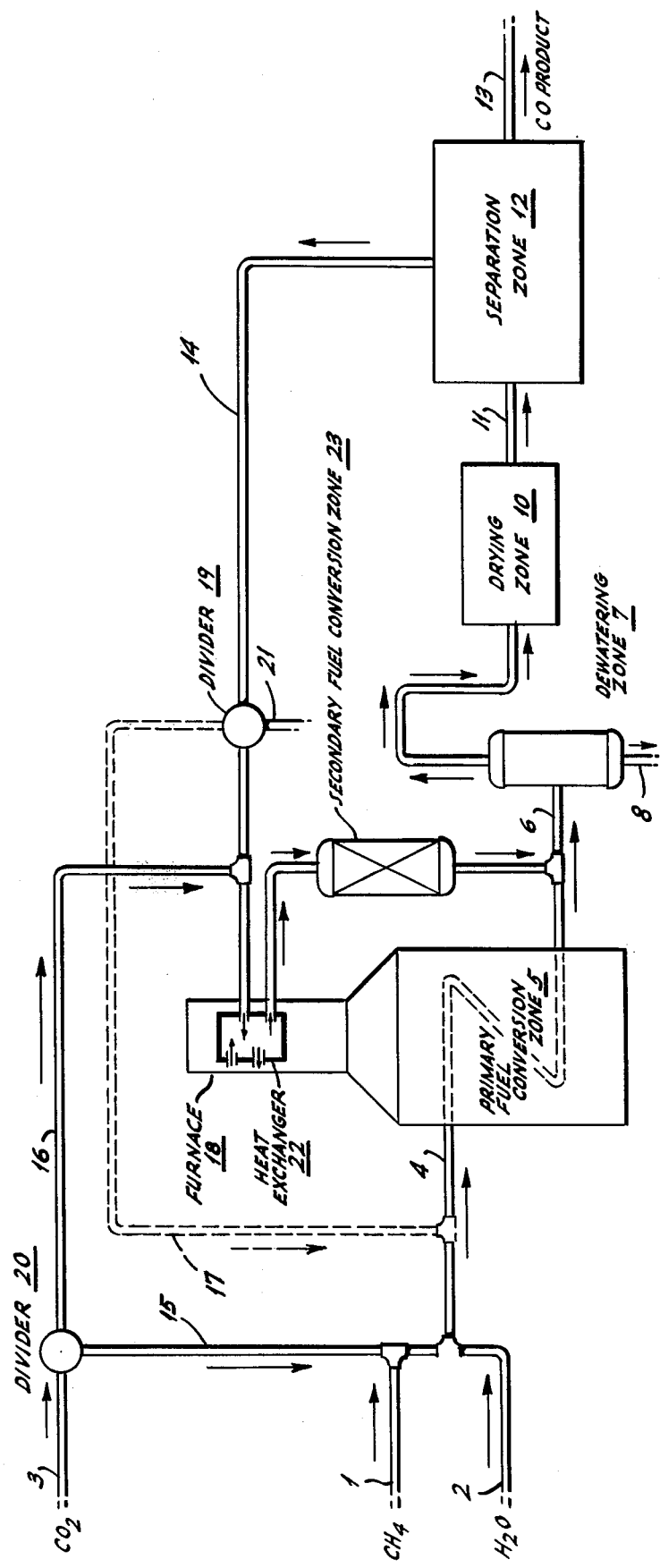

CARBON MONOXIDE MANUFACTURE

CROSS NOTATION OF RELATED APPLICATIONS

Reference is made to a commonly assigned patent application of Myo Myint entitled "Method of Preparing Carbon Monoxide", Ser. No. 916,187, filed June 16, 1978 all of the disclosure of which is deemed here reiterated and incorporated herein.

FIELD OF THE INVENTION

This invention relates to the formation of gases comprising carbon monoxide, to the conversion of a mixture of carbon dioxide and hydrogen to carbon monoxide and water, to the conversion of a mixture of methane and carbon dioxide to carbon monoxide, to the purification of fuel gas streams and to the manufacture of a gas stream constituting carbon monoxide of sufficient purity for use as a reactant in chemical processes.

PRIOR ART

Heretofore synthesis gas has been prepared by the hydration of methane in a fuel conversion zone generally called a reformer. There have been fuel conversion zones in which carbon dioxide has been included in the total feed in order to decrease the hydrogen to carbon monoxide ratio in the synthesis gas.

Voorhies U.S. Pat. No. 2,526,521 stresses the hazard of carbon formation in the catalyst zone if the catalyst is not above 1175° F. at the point at which carbon dioxide is injected into a zone for the hydrolysis of methane. Green U.S. Pat. No. 3,943,236 recirculates hydrogen in making either a synthesis gas or carbon monoxide by hydrolysis of methane, making certain that the carbon dioxide content of the effluent from the reformer is removed prior to the purification of the stream scheduled for withdrawal as the product stream.

Scholars have shown various equations for conversions amongst the fuel gases and calculated some of the equilibria, the heats of reaction and other thermodynamic data. Notwithstanding the significant amount of theoretical studies and laboratory research, there has been a continuing demand for a fuel conversion plant adapted to produce high purity carbon monoxide at a low cost and low consumption of energy, said carbon monoxide stream containing not more than trace amounts of carbon dioxide, hydrogen, steam and/or related impurities.

SUMMARY OF INVENTION

In accordance with the present invention, methane and steam plus added carbon dioxide and if desired, a fraction of the recycle stream, are fed to a primary fuel conversion zone. To a secondary conversion zone are sent the portions of the recycle stream and the carbon dioxide feed not sent to the primary fuel conversion zone, whereby carbon dioxide and hydrogen react in the secondary fuel conversion zone to form steam and carbon monoxide. The effluents from the two fuel conversion zones are mixed and directed through a dewatering zone, and a drying zone. Particular attention is directed to the fact that the gas stream directed to a separation zone comprises carbon dioxide, carbon monoxide, hydrogen and methane. A carbon monoxide product stream is withdrawn from said separation zone. The balance of the gas stream leaves the separation zone as a recycle stream. A divider is available for directing appropriate portions of the recycle stream to (a) the secondary fuel conversion zone, (b) the primary conversion zone if desired, and (c) a withdrawal line if desired for preventing the excessive build up of an undesired component.

The primary fuel conversion zone is maintained at 200° to 1000° C. at a pressure within the range from 3 to 100 atmospheres at an hourly weight space velocity within the range from about 0.1 to about 10. Such zone contains a reforming catalyst comprising nickel on a refractory support.

The combination of temperature, pressure, space rate, and catalyst in the secondary fuel conversion zone is not identical to that in the primary fuel conversion zone, and ordinarily at least one is different, but within the range from about 600° to about 1000° C. at an average pressure within the range from about 3 to about 100 atmosphered at an hourly weight space velocity within the range from about 2 to about 20, and the catalyst is a Group VIII metal on refractory support.

DESCRIPTION OF DRAWINGS

In the accompanying drawings, a flow sheet illustrates a preferred embodiment of the invention.

DESCRIPTION OF PREFERRED EMBODIMENTS

As shown in the flow sheet, a mixed stream 4 is prepared for a primary fuel conversion zone 5. Said stream includes all of the feed methane 1, steam 2 and a controlled portion of carbon dioxide feed 3. A divider 20 directs carbon dioxide through line 15 toward mixed stream 4, and through line 16 toward secondary fuel conversion zone 23. That portion of recycle stream 14 directed through line 17 to stream 4 is regulated by divider 19, which portion may be zero. Said mixed feed stream 4, comprising all of the methane feed 1, steam 2, and an appropriate portion of the carbon dioxide 3, and if desired an appropriate portion of recycle stream 14, is directed to the primary fuel conversion zone 5. Said primary fuel conversion zone 5 partakes of the nature of a reformer for the hydration of methane.

A secondary fuel conversion zone 23 is adapted to produce a mixture of steam and carbon monoxide by reaction of hydrogen and carbon dioxide. At least a portion of the recycle gas and a preselected portion of the carbon dioxide feed are supplied to the secondary fuel conversion zone for the reverse shift reaction.

A furnace 18 for the primary conversion zone 5 is provided with a heat exchanger 22 adapted to heat the gas mixture prior to entering secondary fuel conversion zone 23.

The mixed effluent 6 from both the primary fuel conversion zone 5 and the secondary fuel conversion zone 23 are directed to a dewatering zone 7 from which damp gas stream 9 is withdrawn overhead while withdrawing liquid from the bottoms through line 8. Substantially all significants amounts of moisture are removed from the gas stream in a drying zone 10, thus providing a dry gas stream 11. In a separation zone 12, the dry gas stream 11 is processed. Particular attention is directed to the fact that said dry gas stream 11 contains carbon dioxide, hydrogen and methane in addition to its minor amount of carbon monoxide. Said dry gas stream is selectively treated for the removal of carbon monoxide, whereby there are prepared a recycle stream 14 and a product stream 13 consisting of a technical grade of carbon monoxide Divider 19 directs appropriate portions (ncluding zero portions) of recycle stream 14 to secondary conversion zone 23, to primary conversion zone 5 through line 17, and to withdrawal line 21 if desired for preventing the excessive build up of an undesired component.

As an example of the process, a mixture consisting of three volumes of carbon dioxide and one volume of methane are converted to four volumes of carbon monoxide at a rate of about 6,000,000SCFD. In the primary fuel conversion zone, a catalyst containing about 15% nickel on a relatively nonporous refractory support such as alumina-titania containing about 99.5% alumina and 0.5% titania is employed. Another catalyst which is suitable is known as Girdler 56 HT reformer catalyst.

In one embodiment the primary fuel conversion zone is maintained at about 800° C. at about 8 atmospheres pressure at a weight hourly space velocity of about 0.5. No recycle gas is directed to the primary fuel conversion zone. The feed to such zone consists of two volumes of steam, one volume of carbon dioxide and one volume of methane. The conversion of the methane is about 95.17% complete, but only about 27.4% of the $CO_2$ is converted to CO. The effluent from the primary fuel conversion zone is mixed with the effluent from the secondary fuel coversion (reverse shift) zone, and directed through a dewatering zone, a drying zone, and a separation zone. A solution of $CuAlCl_4$ in toluene is employed in an extraction process known as "cosorb" for separating a carbon monoxide stream of sufficient purity to be employed in the production of polyisocyanates. The balance of the gas is a recycle stream, all of which flows through the divider to the heat exchanger and thence to the secondary fuel conversion zone. The recycle stream is exhaustively recycled because none of the components tends to build up to excessively troublesome concentrations. The heat exchanger heats the stream to about 840° C., and after the hydrogenative reduction of carbon dioxide in the secondary fuel conversion zone the effluent has a temperature of about 700° C. The $CO_2$ conversion in such reverse shift reaction is about 25%. The composition of the effluent from the secondary fuel conversion zone is approximately:

| | |
|---|---|
| $H_2$ | 34.9% |
| CO | 12.0% |
| $CO_2$ | 34.9% |
| $CH_4$ | 6.6% |
| $H_2O$ | 11.6% |
| | 100.0% |

The composition of the effluent from the reformer is approximately as follows:

| | |
|---|---|
| $H_2$ | 44.7% |
| CO | 19.9% |
| $CO_2$ | 13.2% |
| $CH_4$ | 0.8% |
| $H_2O$ | 21.4% |
| | 100.0% |

The catalyst employed in the secondary fuel conversion zone is again Girdler 56 HT catalyst or a 15% nickel on alumina (0.5% titania stabilizer) support. The pressure of the reactor is maintained at about seven atmospheres, and the space rate is about three weight hourly space velocity.

Various modifications of the invention are possible without departing from the scope of the claims.

The invention claimed is:

1. A process for generating carbon monoxide which includes the steps of:
   converting methane feed to a mixture of carbon monoxide product and hydrogen by reaction with a gas mixture comprising carbon dioxide feed and steam in a primary fuel conversion zone;
   converting carbon dioxide feed to carbon monoxide by reaction with a gas mixture comprising hydrogen in a secondary fuel conversion zone;
   combining the effluents from the primary and secondary zones, and directing such combined effluents through a dewatering zone and a drying zone;
   directing from the drying zone a gas stream consisting of carbon dioxide, hydrogen, methane, and carbon monoxide to a separation zone;
   separating a carbon monoxide product stream from a recycle stream in said separation zone;
   directing at least a portion of said recycle stream to said secondary fuel conversion zone;
   directing at least a portion of the carbon dioxide feed to the secondary fuel conversion zone and a portion of the carbon dioxide feed to the primary fuel conversion zone;
   maintaining the primary fuel conversion zone at a temperature within the range from about 200 to about 1000° C. at an average pressure within the range from about 3 to about 100 atmospheres, said primary fuel conversion zone containing sufficient nickel on refractory support to maintain an hourly weight space velocity within the range froom about 0.1 to about 10;
   maintaining the secondary fuel conversion zone at a temperature within the range from about 600 to about 1000° C. at an average pressure within the range from about 3 to about 100 atmospheres said secondary fuel conversion zone containing sufficient catalyst characterized as a Group VIII metal on a refractory support to maintain an hourly weight space velocity within the range from about 2 to about 20;
   and controlling the feed to provide substantially three mols of carbon dioxide per mol of methane.

* * * * *